US012724601B2

(12) United States Patent
Xu et al.

(10) Patent No.: US 12,724,601 B2
(45) Date of Patent: Sep. 1, 2026

(54) METADATA DOCUMENT UPDATES FOR APPLICATION DEVELOPMENT PLATFORM

(71) Applicant: SAP SE, Walldorf (DE)

(72) Inventors: Chang Xu, Beijing (CN); Zhen-Kun Li, Beijing (CN)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 18/597,025

(22) Filed: Mar. 6, 2024

(65) Prior Publication Data

US 2025/0284477 A1 Sep. 11, 2025

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ..................................... G06F 8/65; G06F 8/71
USPC .................................. 717/120–123, 168–173
See application file for complete search history.

(56) References Cited

U.S. PATENT DOCUMENTS 9,661,056 B2 * 5/2017 Selvaraj .................. H04L 67/02
9,811,393 B2 * 11/2017 Kiehtreiber ............... G06F 9/54
12,019,621 B2 * 6/2024 Rodrigues ............. G06F 16/219
12,120,124 B1 * 10/2024 Davis .................... H04L 63/105
2015/0067637 A1 3/2015 Charfi et al.

OTHER PUBLICATIONS

Guerra et al., "A Model to Enable the Reuse of Metadata-Based Frameworks in Adaptive Object Model Architectures", 2021, IEEE Access, pp. 85124-85143. (Year: 2021).*

* cited by examiner

*Primary Examiner* — Ted T. Vo
(74) *Attorney, Agent, or Firm* — Buckley, Maschoff & Talwalkar LLC

(57) ABSTRACT

A base application data store may contain a base application source metadata file with at least one extension point that defines a permission associated with the extension point in connection with a base application. An extension application server, coupled to the base application data store, retrieves the base application source metadata file and caches the base application source metadata file as a read only file. The extension application server then generates a merge map file with an extension change to the base application metadata file. The base application source metadata file and the merge map file may be, for example, merged in accordance with the defined permission to create a result metadata file for the base application. In some embodiments, the extension application server subscribes to application updates for the base application, and the extension change is reported and validated in accordance with the permission associated with extension point.

16 Claims, 20 Drawing Sheets

Figure 7:
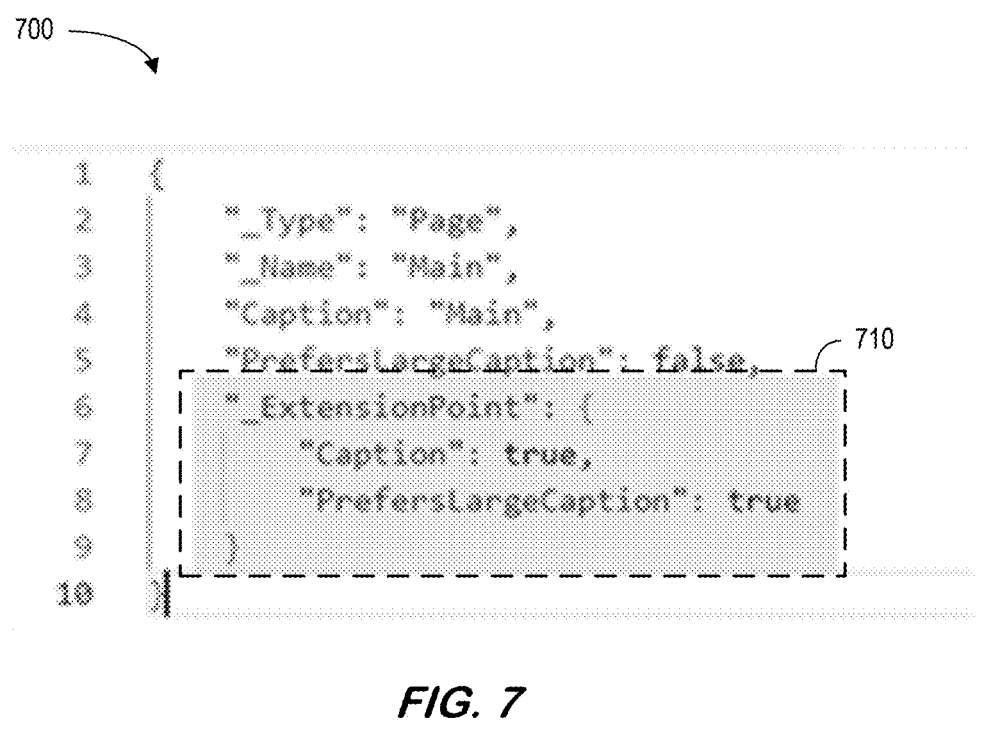

700

710

```
{
    "_Type": "Page",
    "_Name": "Main",
    "Caption": "Main",
    "PrefersLargeCaption": false,
    "_ExtensionPoint": {
        "Caption": true,
        "PrefersLargeCaption": true
    }
}
```

```
{
    "_Type": "Action.Type.ODataService.UpdateEntity",
    "ActionResult": {
        "_Name": "updatedata"
    },
    "Properties": {
        "City": "test city",
        "Country": "test country"
    },
    "_ExtensionPoint": {
        "Properties": [
            "Add",
            "Remove"
        ]
    }
}
```

```
{
    "_Type": "Action.Type.ODataService.UpdateEntity",
    "ActionResult": {
        "_Name": "updatedata"
    },
    "Properties": {
        "City": "test city",
        "Country": "test country"
    },
    "_ExtensionPoint": {
        "Properties": true
    }
}
```

Figure 10:
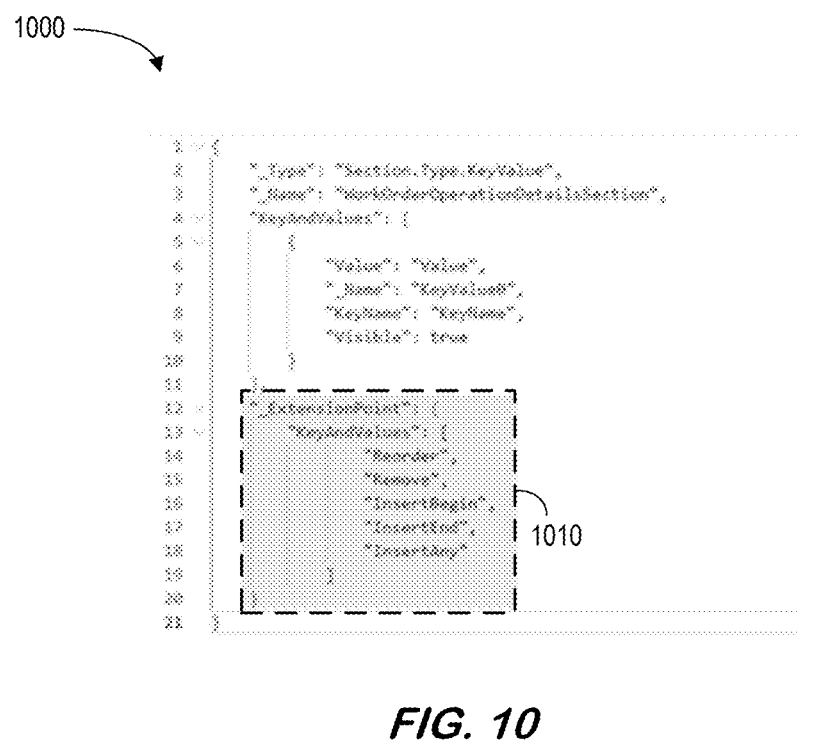

```
{
    "_Type": "Section.Type.KeyValue",
    "_Name": "WorkOrderOperationDetailsSection",
    "KeyAndValues": [
        {
            "Value": "Value",
            "_Name": "KeyValue0",
            "KeyName": "KeyName",
            "Visible": true
        }
    ],
    "_ExtensionPoint": {
        "KeyAndValues": [
                "Reorder",
                "Remove",
                "InsertBegin",
                "InsertEnd",
                "InsertAny"
        ]
    }
}
```

```
{
    "_Type": "Section.Type.KeyValue",
    "_Name": "WorkOrderOperationDetailsSection",
    "KeyAndValues": [
        {
            "Value": "Value",
            "_Name": "KeyValue0",
            "KeyName": "KeyName",
            "Visible": true
        }
    ],
    "_ExtensionPoint": {
        "KeyAndValues": true
    }
}
```

| APPLICATION IDENTIFIER 1802 | BASE METADATA FILE 1804 | MERGE MAP FILE 1806 | RESULT FILE 1808 | VALIDATION STATUS 1810 |
|---|---|---|---|---|
| A_101 | BM_JSON_101 | MM_101 | R_101 | VALIDATED |
| A_102 | BM_JSON_102 | MM_102 | R_102 | ERROR |
| A_103 | BM_JSON_103 | MM_103 | R_103 | VALIDATED |

*FIG. 18*

METADATA DOCUMENT UPDATES FOR APPLICATION DEVELOPMENT PLATFORM

BACKGROUND

An application development platform may provide a framework that lets a developer define user applications. The platform may, for example, let the developer customize, deploy, and manage customized applications in the cloud. It may also provide native client support and consume service capabilities such as onboarding, offline Open Data Protocol ("OData") information, life cycle management, and/or supportability. In some cases, the application development platform may be metadata-based and use, for example, a Java Script Object Notation ("JSON") document to define metadata that lets a developer specify page, action, service, application configuration settings, etc. for an application.

In a typical framework, a base application developer may establish a base version of the application (and metadata) that may be periodically updated. An extension application developer may then make adjustments to customize the base application and create an "extended" version of the application as desired (e.g., by changing an icon label in an interface). Note, however, that some changes to the metadata might be prohibited. Moreover, manually coordinating metadata changes as they are continuously updated by both the base application developer and various extension developers can be a challenging process. It would therefore be desirable to provide improved ways for extended application updates in a secure, automatic, and efficient manner.

SUMMARY

According to some embodiments, methods and systems associated with a metadata-based application development platform may include a base application data store that contains a base application source metadata file with at least one extension point. The extension point defines a permission associated with the extension point in connection with a base application. An extension application server, coupled to the base application data store, retrieves the base application source metadata file and caches the base application source metadata file as a read only file. The extension application server then automatically generates a merge map file with an extension change to the base application metadata file. The base application source metadata file and the merge map file may be, for example, merged in accordance with the defined permission to create a result metadata file for the base application. In some embodiments, the extension application server subscribes to application updates for the base application, and the extension change is reported and validated in accordance with the permission associated with extension point.

Some embodiments comprise: means for retrieving, by a computer processor of an extension application server, a base application source metadata file from a base application data store, the base application source metadata file including at least one extension point that defines a permission associated with the at least one extension point in connection with a base application; means for caching, by the computer processor of the extension application server, the base application source metadata file as a read only file; and means for automatically generating a merge map file with an extension change to the base application metadata file, wherein the base application source metadata file and the merge map file are merged in accordance with the defined permission to create a result metadata file for the base application.

Some technical advantages of some embodiments disclosed herein are improved systems and methods to provide extended application updates in a secure, automatic, and efficient manner.

BRIEF DESCRIPTION OF THE DRAWINGS

FIG. 7 is a file with an extension point setting for a simple property according to some embodiments.

FIG. 8 is a file with an add or remove extension point setting for an object property in accordance with some embodiments.

FIG. 9 is a file with an override extension point setting for an object property according to some embodiments.

FIG. 10 is a file with a re-order, remove, or insert extension point setting for an array property in accordance with some embodiments.

FIG. 11 is an override extension point setting for an array property according to some embodiments.

FIG. 18 is a portion of an extension data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
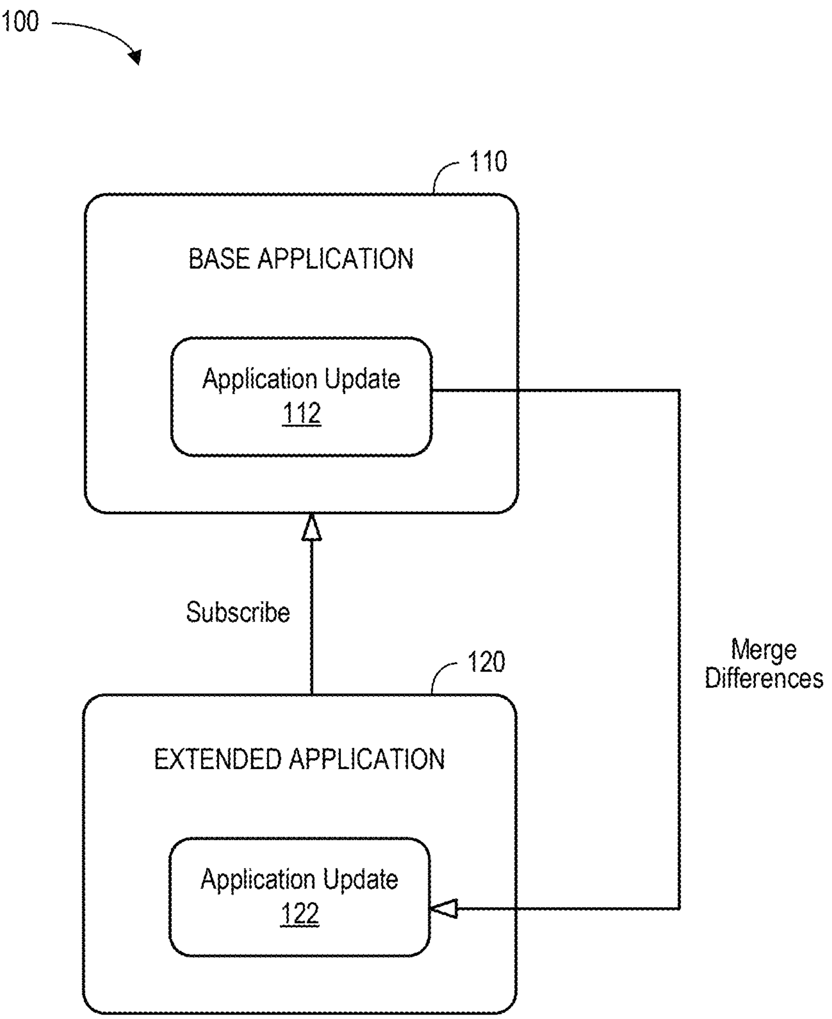
FIG. 1 is a system associated with a metadata-based application development platform.

An application development platform may provide a framework that lets a developer define user applications. For example, the Mobile Development Kit ("MDK") for SAP™ Mobile Services is a metadata-based application development platform that lets developer customize, deploy, and manage customized iOS and Android applications in the cloud. It also provides native client support and consumes mobile services capabilities such as onboarding, offline OData, life cycle management, and supportability through the SAP™ Business Technology Platform using a MDK client. FIG. 1 is a system 100 associated with a metadata-based application development platform. The system 100 includes a base application 110 that can be used to create an extended application 120. The system 100 lets a base application developer generate metadata and JavaScript (in an editor) which is translated to native code at runtime and deployed to a native applications on devices. The same metadata can also be deployed to the web to run the same application in a browser. Reusable components are stand-alone applications that can include pages, actions, rules and global variables. As stand-alone applications, they can be built, tested, and updated separately from the base application 110 to customize, add-on, and/or extend existing applications without modifying the base application 110. The extended application 120 may subscribe to the base application 110 such that any application update 112 to the base application 110 can be applied to the extended application 120 as an application update 122.

Figure 2:
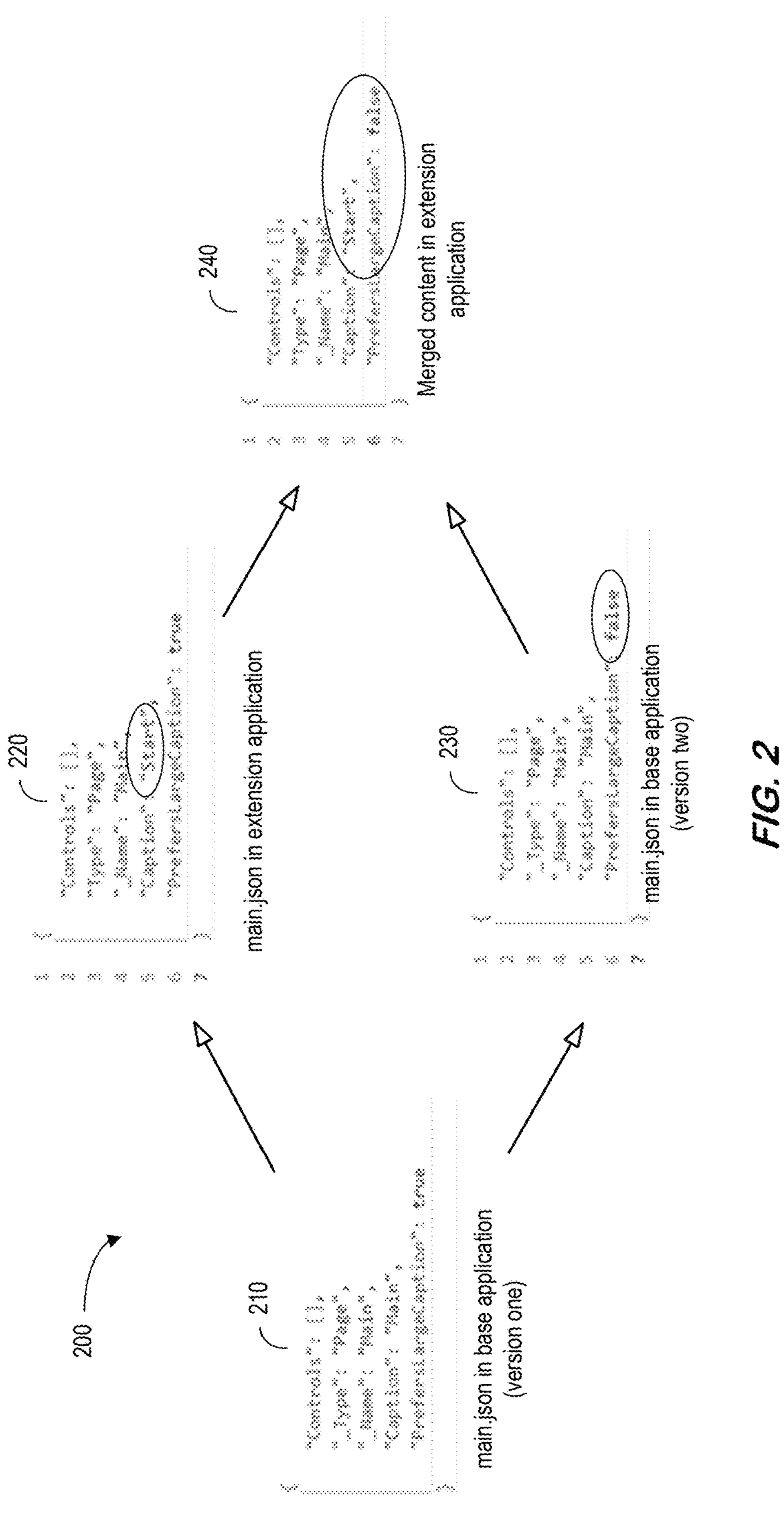
FIG. 2 is an example of a merge associated with a metadata-based application development platform extension.

Differences in the metadata between the base application 110 and the extended application 120 may need to be merged. For example, a customer may like to extend an existing MDK application with released metadata, and to customize it for further development. When the base metadata changes, the extended application can get the updates and merge the difference automatically without any manual changes in accordance with some embodiments. FIG. 2 is an example 200 of a merge associated with a metadata-based application development platform extension. A base application includes a main.json file (version one) 210. An extension application developer wants to extend the base application and customize it. As a result, in the extension application the main.json file 220 changes the property "Caption" value from "Main" to "Start." Then, the base application is updated and in the main.json file (version two) 230 the property "PrefersLargeCaption" value is changed from "true" to "false." Finally, in the extension application the result main.json 240 should reflect merged content from those two files 220, 230 (with property "Caption" equaling "Start" and property "PrefersLargeCaption" equaling "false."

Figure 3:
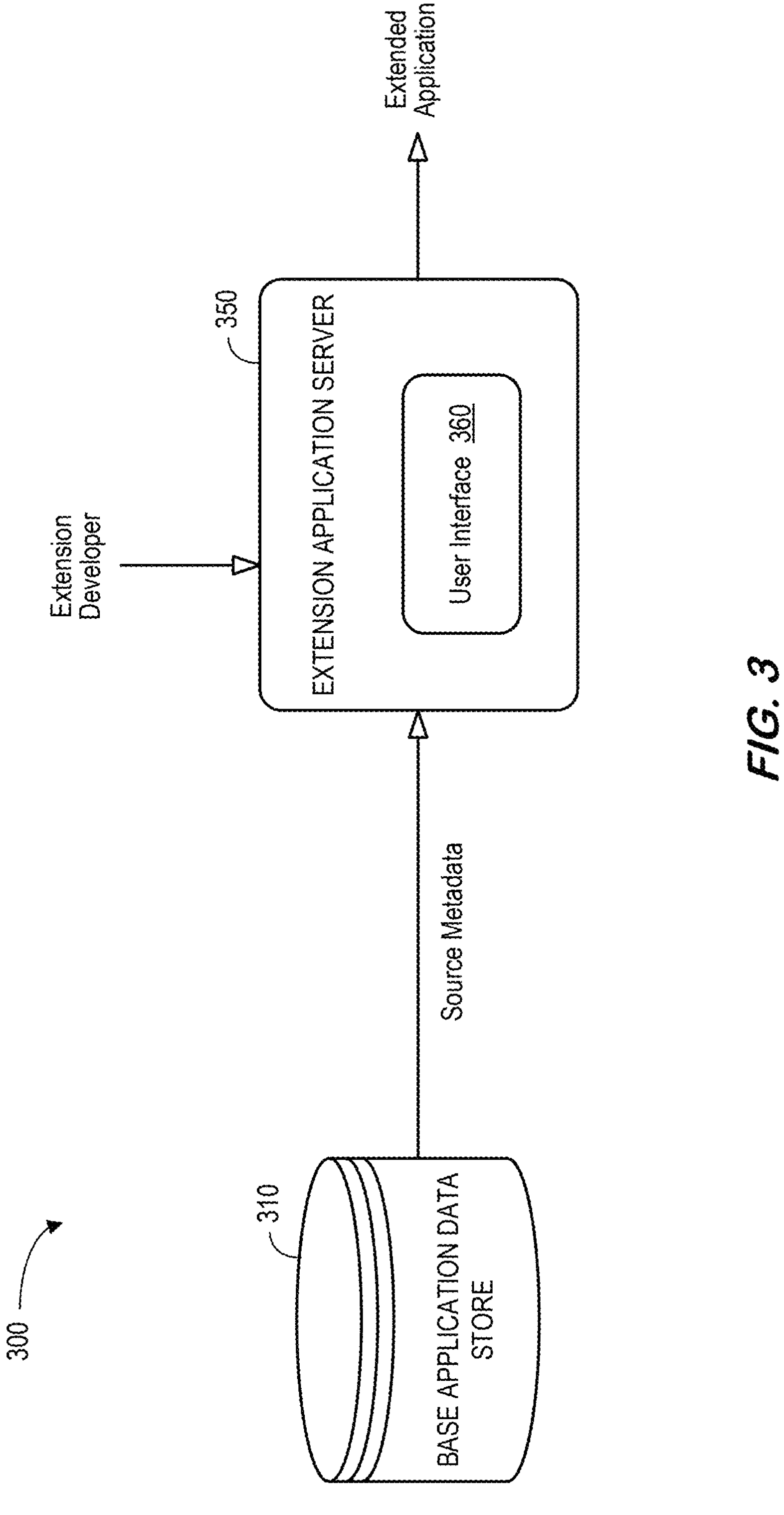
FIG. 3 is a high-level architecture of a system according to some embodiments.

FIG. 3 is a high-level block diagram of one example of a system 300 associated with application development in which a base application data store 310 may exchange information with an extension application server 350. In particular, the extension application server 350 may receive source metadata from the base application data store 310. The source metadata may be associated with, for example, a base application.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The extension application server 350 may store information into and/or retrieve information from various data stores (e.g., the base application data store 310), which may be locally stored or reside remote from the extension application server 350. Although a single extension application server 350 is shown in FIG. 3, any number of such devices may be included. Moreover, various devices described herein might be combined according to embodiments of the present invention. The system 300 functions may be performed by a constellation of networked apparatuses, such as in a distributed processing or cloud-based architecture.

An operator or administrator may access the system 300 via a remote device (e.g., a Personal Computer ("PC"), tablet, or smartphone) to view information about and/or manage operational information in accordance with any of the embodiments described herein. In some cases, a User Interface ("UI") 360 may let an operator, administrator, or extension developer define and/or adjust certain parameters via a remote device (e.g., to specify metadata adjustments for an extended application) and/or provide or receive automatically generated recommendations, alerts, or results associated with the system 300.

Figure 4:
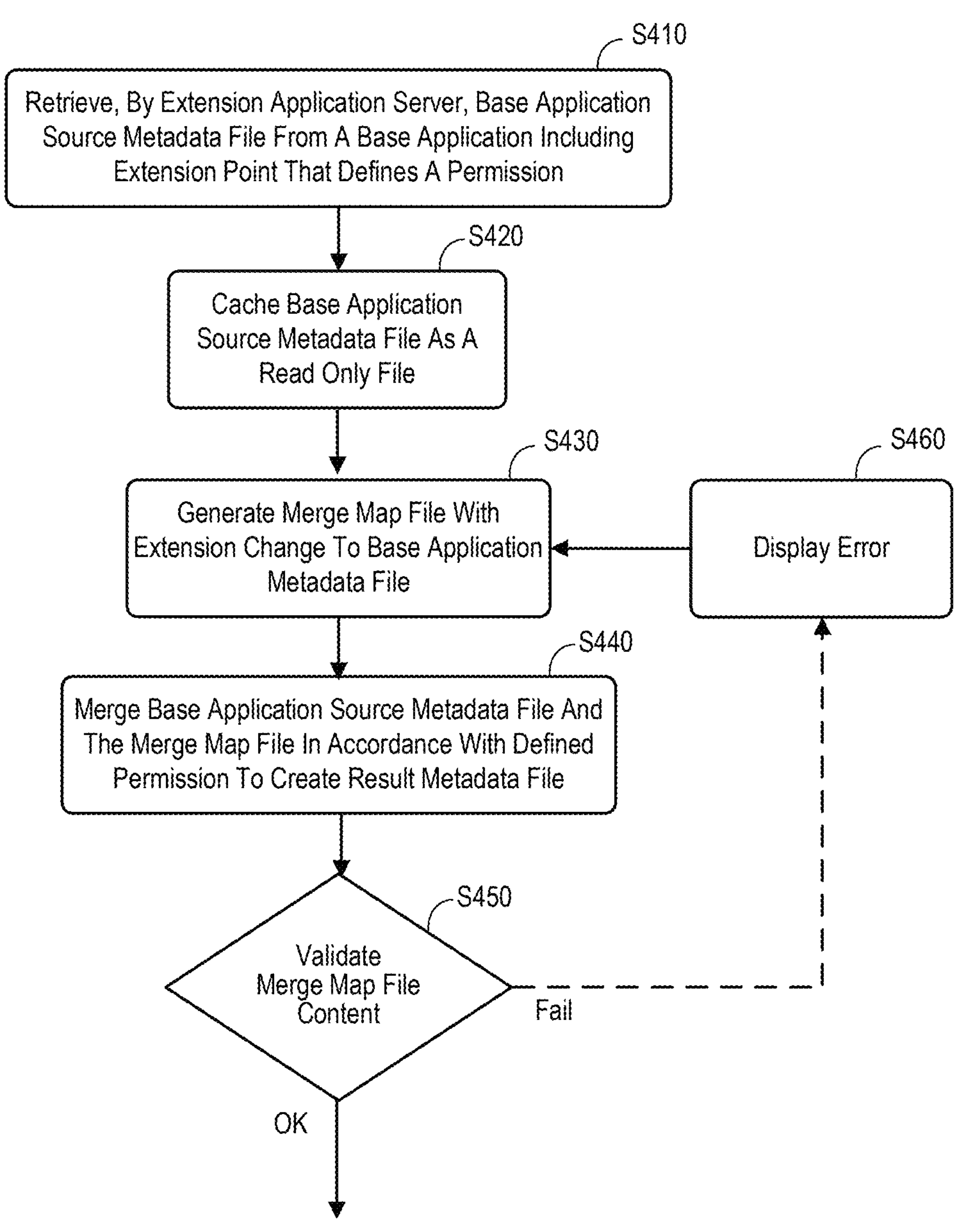
FIG. 4 is a method in accordance with some embodiments.

FIG. 4 is a method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, a computer processor of an extension application server may retrieve a base application source metadata file from a base application data store. The base application source metadata file may include at least one extension point that defines a permission associated with the extension point in connection with a base application. According to some embodiments, the extension application server subscribes to application updates for the base application. At S420, the computer processor of the extension application server may cache the base application source metadata file as a read only file. According to some embodiments, the base application source metadata file includes a plurality of extension points that each define at least one permission in connection with the base application.

At S430, the system may automatically generate a merge map file with an extension change to the base application metadata file (e.g., in accordance with information received from an extension developer). At S440, the base application source metadata file and the merge map file may be merged in accordance with the defined permission to create a result metadata file for the base application. In some embodiments, the extension point and permission are associated with a simple property and comprise an indication of which properties are allowed to be extended. As another example, the extension point and permission may be associated with an object property and comprise an ability to add, remove, and/or override an object property. As still another example, the extension point and permission might be associated with an array property and an ability to reorder, remove, and/or insert information in an array.

According to some embodiments, the extension change is reported and validated in accordance with the permission associated with the extension point. If the extension change is OK at S450, the process is complete. If the extension change fails validation at S450, and error is displayed at S460. For example, the error might be displayed to an extension developer in substantially real time when the extension change is incompatible with the permission (so that the process can continue at S430 to let the extension developer make a correction). In some embodiments, an error summary project report table may be provided to a base developer for extension changes that were incompatible with the permission.

Figure 5:
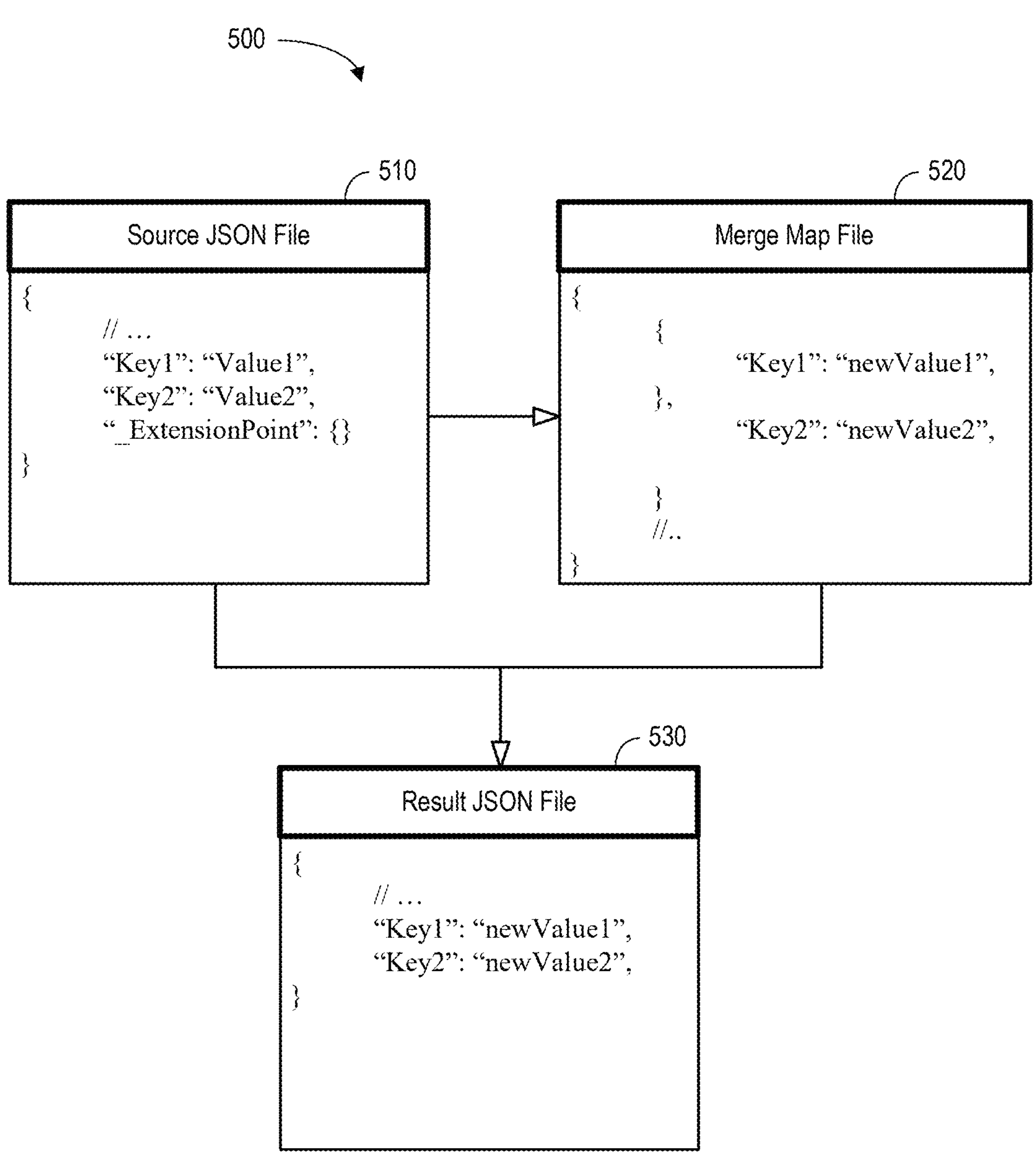
FIG. 5 is an example of an automatic extension merge according to some embodiments.

FIG. 5 is an example 500 of an automatic extension merge according to some embodiments. In a source or base JSON file 510, extension points are defined in the base application for any files that we want to let an extension application change. The extension application caches the whole base application content as a read only file. If the developer wants to change the file, any content coming from the base application automatically generates a new merge map 520 that includes all of the changes. When the base application is updated, all updates are synchronized to the cached content in the extension application. A result JSON file 530 is merged from the latest source file from the base application and the merge map file that was generated by the extension application.

Figure 6:
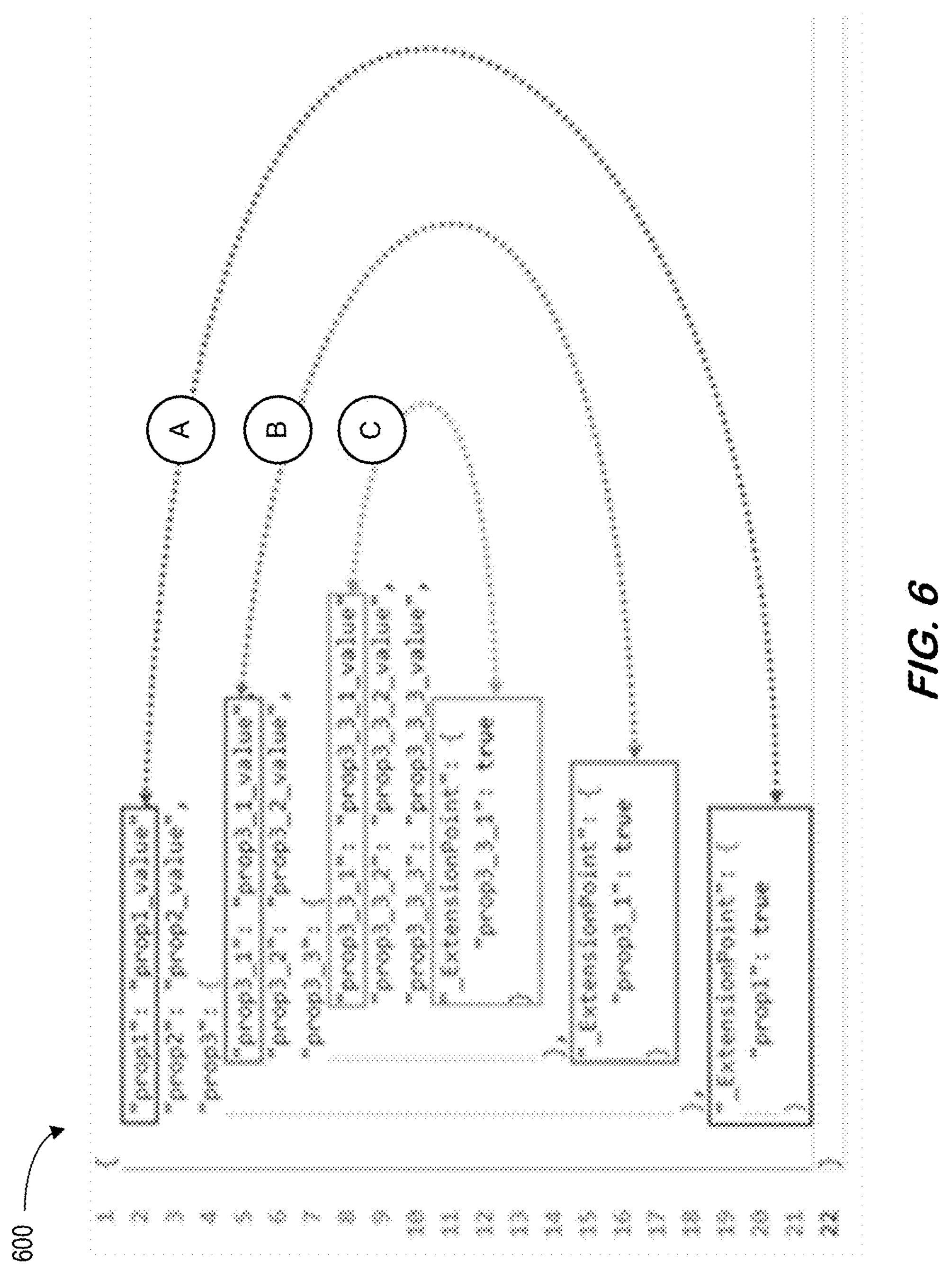
FIG. 6 is an example including multiple extension points in accordance with some embodiments.

In any JSON document that defines extension points, one or more "_ExtensionPoint" properties can be added at the same level of the property that will allow changes. FIG. 6 is an example JSON document 600 that includes multiple extension points in accordance with some embodiments. A section (A) is setting an extension point for a first level property "prop1", a section (B) is setting an extension point for a second level property "prop3_1", and a section (C) is setting an extension point for a third level property "prop3_3_1", etc.

According to some embodiments, an extension point may be associated with a simple property. This may be applicable, for example, in connection with property types of Boolean, string, and/or number. It may use a Boolean value to indicate which properties can be extended. FIG. 7 is a file with an extension point setting for a simple property 700 according to some embodiments. Here, only the property "Caption" and "PrefersLargeCaption" values are allowed to be changed 710 in an extension application (and other properties cannot be changed).

According to some embodiments, an extension point may be associated with an object type property. For example, an add and/or remove extension point may allow for adding new properties to an object or removing existing properties from an object. FIG. 8 is a file with an add or remove extension point setting for an object property 800 in accordance with some embodiments. Here, only "Properties" is allowed to add new properties or remove existing properties 810 in the extension application. As another example, an override extension point may apply to the whole object property. FIG. 9 is a file with an override extension point setting for an object property 900 according to some embodiments. Here, the "Properties" is allowed to be changed to any other value in the extension application 910, such as a string or a number.

According to some embodiments, an extension point may be associated with an array property. According to some embodiments, such an extension point supports three different definitions: (1) reorder, (2) remove, and (3) insert. Reorder and remove may allow reordering or removing items for an array property and insert may allow for the insertion of one or more items at a specified position into the current array property. There are three positions are supported:

InsertBegin: at the beginning position,

InsertEnd: at the ending position, and

InsertAny: at the any position.

FIG. 10 is a file with a re-order, remove, or insert extension point setting for an array property 1000 in accordance with some embodiments. Here, the property "KeyAndValues" value is allowed to reorder, remove, or insert new items to any position of the "KeyAndValues" array in the extension application 1010. As with the object type property, embodiments may also override the whole array property. FIG. 11 is an override extension point setting for an array property 1100 (applying to "KeyAndValues" 1110) according to some embodiments.

Figure 12:
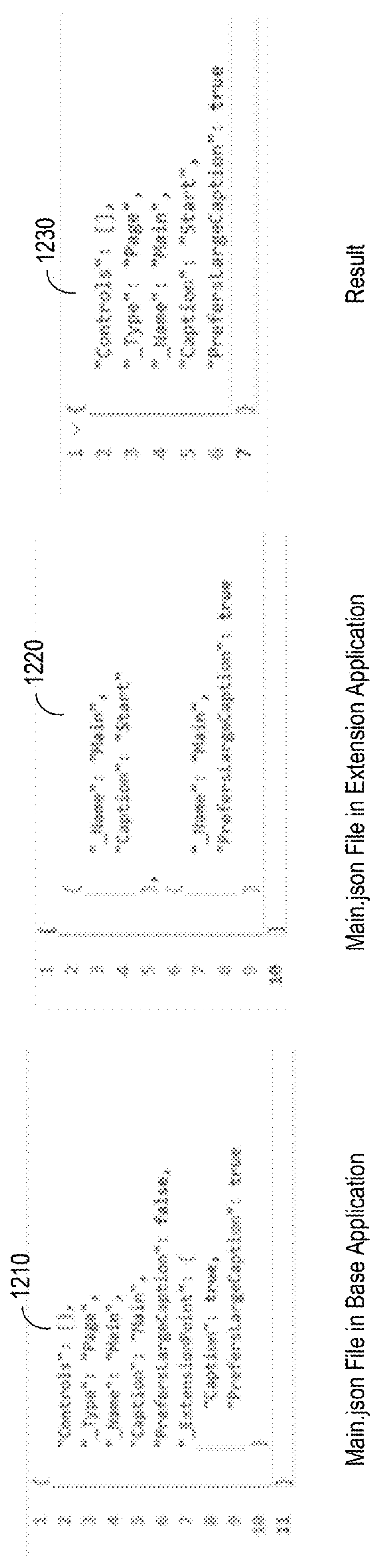
FIG. 12 is an example in accordance with some embodiments.

In an extension application, the whole base application content will be cached as a read only file. If needed, a developer can synchronize it from the base application to get updates at any time. When the JSON file content is changed, a new merge map file will be generated automatically with the same name as the original JSON file. All of the changed content will be contained in the merge map file. FIG. 12 is an example 1200 in accordance with some embodiments.

A main.json file in a base application 1210 includes extension points and is cached in an extension application. When the file content is updated, the main.json file 1210 will not be changed. Instead, a new main.merge map file will be generated as shown by the main.json file in extension application 1220. This can then be used to create the result 1230.

In the merge map file, the content may always be treated as an array and each item may comprise a changing point based on the extension point setting in the source JSON file of the base application. Here, the property "_Name" is required and the value must be unique in the source JSON document. Subsequently, the automatic merging process will use it to locate the position in the source JSON document.

Figure 13:
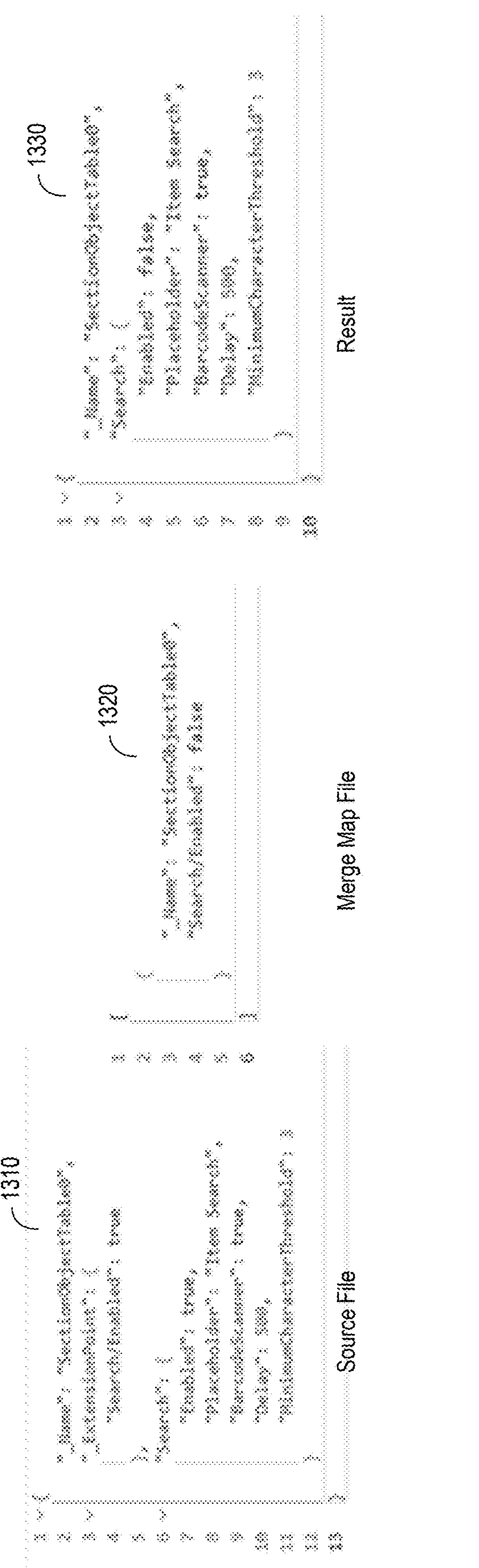
FIG. 13 is an example where only a "Search.Enabled" property can be changed according to some embodiments.
Figure 14:
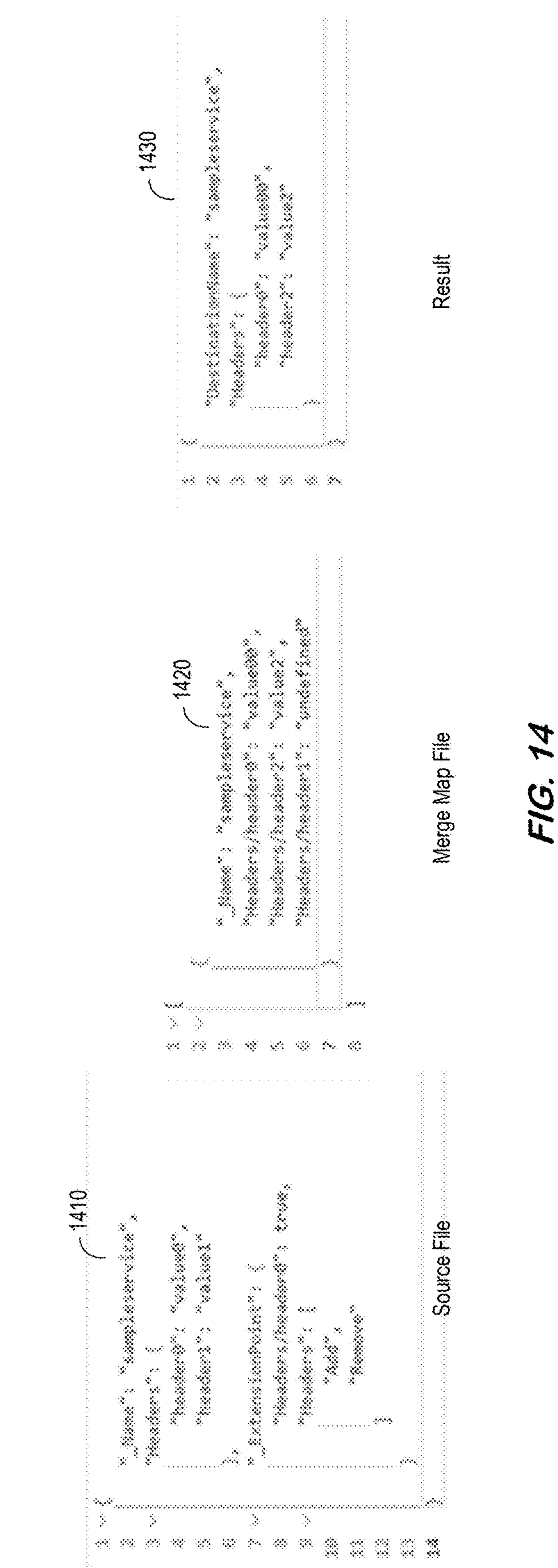
FIG. 14 is an example where only a "Headers" object property is allowed to add or remove properties in accordance with some embodiments.

This example 1200 is related to one of the different extension point settings (which is the easiest scenario). FIG. 13 is another possible example 1300 of a source file 1310, a merge map file 1320, and a result 1330 where only a "Search.Enabled" property can be changed according to some embodiments. FIG. 14 is still another example 1400 of a source file 1410, a merge map file 1420, and a result 1430 where only a "Headers" object property is allowed to add or remove properties in accordance with some embodiments. In particular, the property "Headers/header0" is allowed to be changed as "value00" because in source file there is a setting "Headers/header0": true in the "_ExtensionPoint" section. Besides that, in merge map file "Headers/header1": "undefined" means that the property "Headers.header1" will be removed during the merging process, and "Headers/header2": "value2" is a newly added item.

Figure 15:
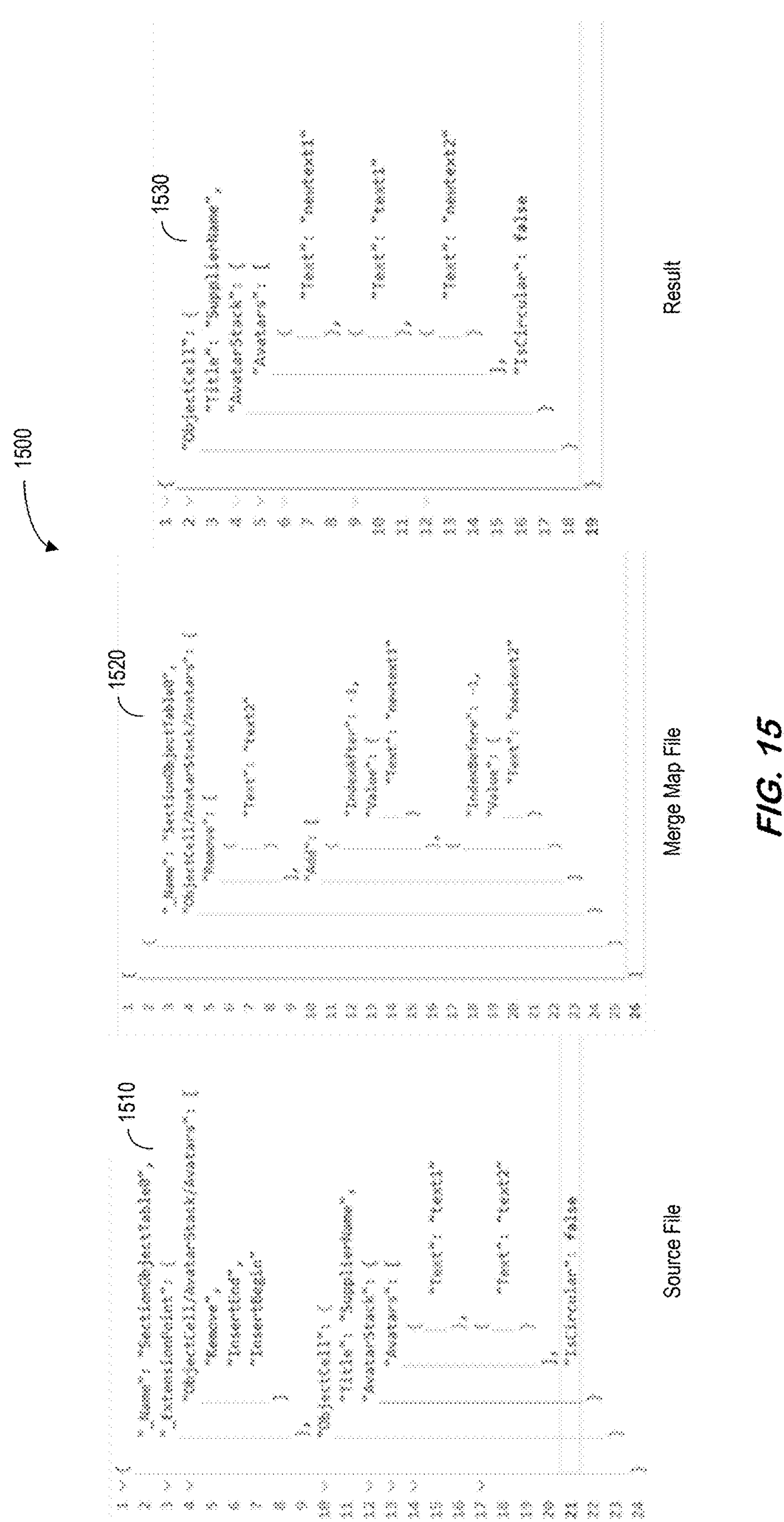
FIG. 15 is an example of an array type property according to some embodiments.

FIG. 15 is an example 1500 of a source file 1510, a merge map file 1520, and a result 1530 associated with an array type property according to some embodiments. The example 1500 removes "text2" and adds two new items "newtext1" and "newtext2." The keyword "IndexAfter" means starting from the beginning of the array items, and the keyword "IndexBefore" means starting from the ending of the array items (they both may, for example, count from −1). The merge map file 1520 is generated based on the "_ExtensionPoint" definition in the source JSON file 1510, and result 1530 content in the final JSON file is merged from the source JSON file 1510 and merge map file 1520.

Figure 16:
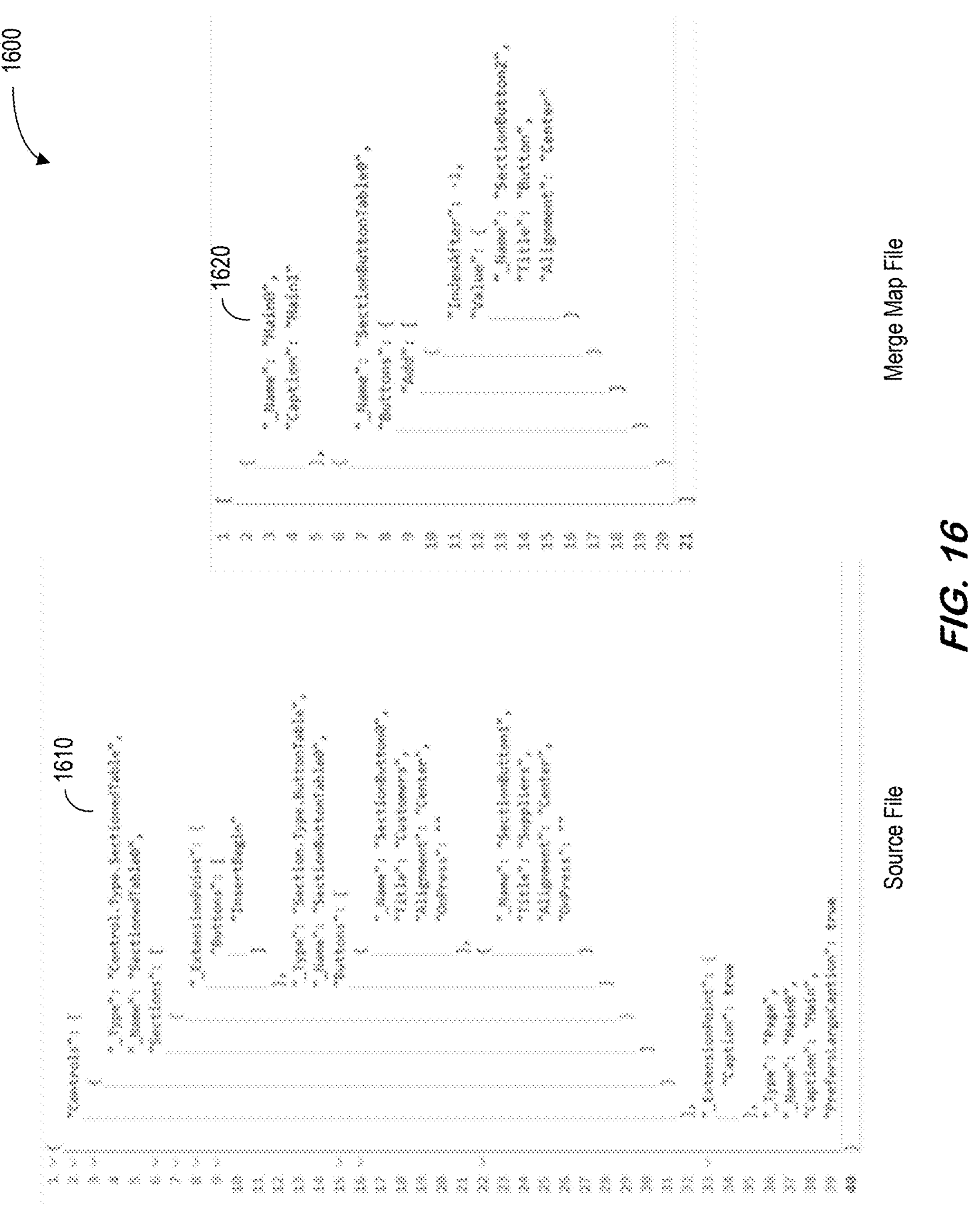
FIG. 16 is an example of a "_Name" property in a merge map file in accordance with some embodiments.

FIG. 16 is an example 1600 of a "_Name" property in a source file 1610 a merge map file 1620 in accordance with some embodiments. Note that the "_Name" property may not be required in the merge map file 1620 unless there are multiple "_ExtensionPoint" definitions in the source JSON file 1610. Considering the example 1600 of FIG. 16, there are two "_ExtensionPoint" definitions, so the generated merge map file 1620 uses "_Name" property to distinguish each changing point.

Figure 17:
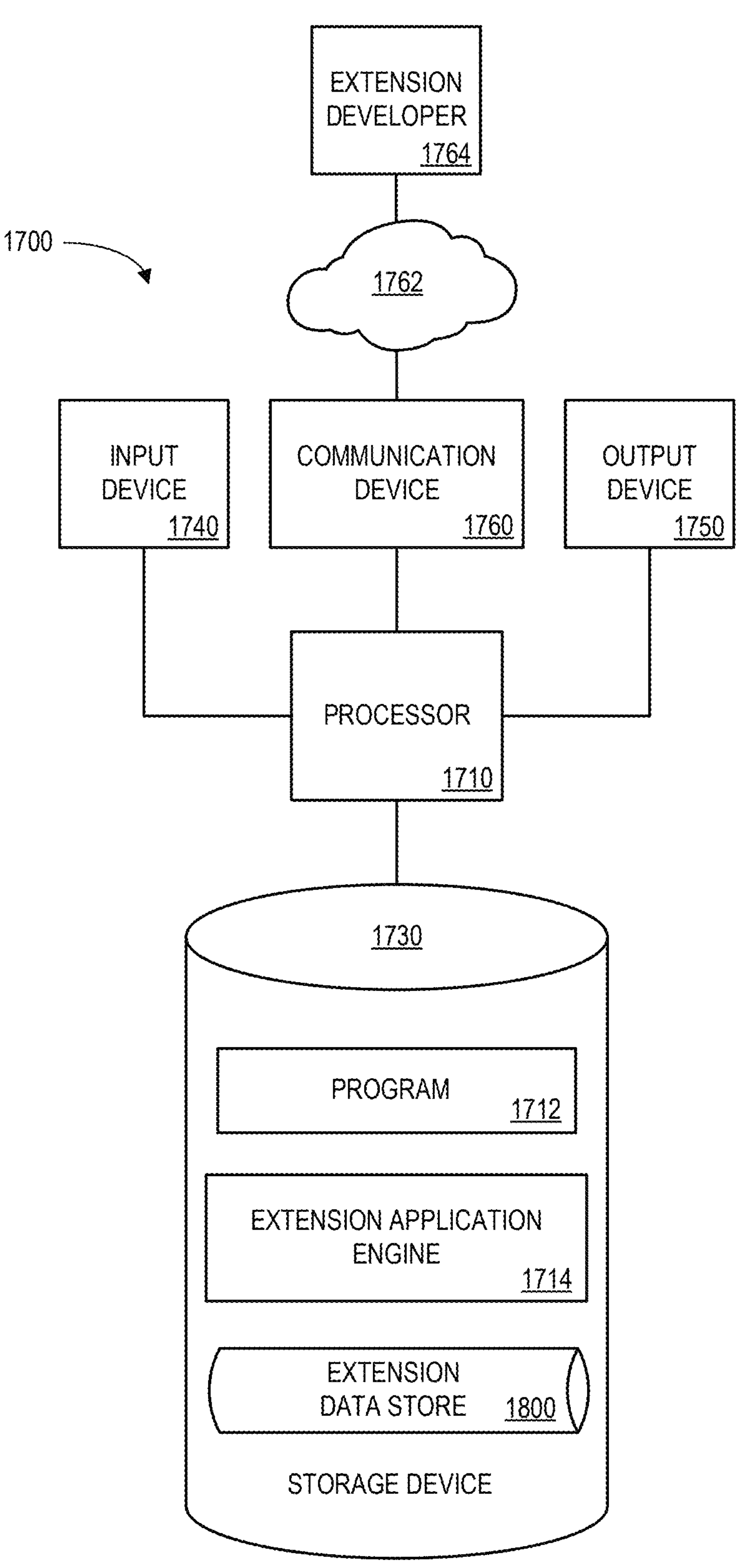
FIG. 17 is an apparatus or platform according to some embodiments.

Note that the embodiments described herein may be implemented using any number of different hardware configurations. For example, FIG. 17 is a block diagram of an apparatus or platform 1700 that may be, for example, associated with the system 300 of FIG. 3 (and/or any other system described herein). The platform 1700 comprises a processor 1710, such as one or more commercially available Central Processing Units ("CPUs") in the form of one-chip microprocessors, coupled to a communication device 1760 configured to communicate via a communication network 1762. The communication device 1760 may be used to communicate, for example, with one or more remote extension developers 1764, administrator platforms, etc. The platform 1700 further includes an input device 1740 (e.g., a computer mouse and/or keyboard to input mappings and/or merging information) and/or an output device 1750 (e.g., a computer monitor to render a display, transmit recommendations and alerts, and/or create reports about mergers, extensions, tenants, etc.).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or extension application engine 1714 for controlling the processor 1710. The processor 1710 performs instructions of the programs 1712, 1714, and thereby operates in accordance with any of the embodiments described herein. For example, the processor 1710 may retrieve a base application source metadata file and cache the base application source metadata file as a read only file. The processor 1710 may then generate a merge map file with an extension change to the base application metadata file. The base application source metadata file and the merge map file may be, for example, merged in accordance with the defined permission to create a result metadata file for the base application. In some embodiments, the extension application server subscribes to application updates for the base application, and the extension change is reported and validated in accordance with the permission associated with extension point.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores an extension data store 1800. An example of a database that may be used in connection with the platform 1700 will now be described in detail with respect to FIG. 18. Note that the database described herein is only one example, and additional and/or different information may be stored therein. Moreover, various databases might be split or combined in accordance with any of the embodiments described herein.

Referring to FIG. 18, a table is shown that represents the extension data store 1800 that may be stored at the platform 1700 according to some embodiments. The table may include, for example, entries identifying applications and/or extensions associated with a metadata-based application development platform. The table may also define fields 1802, 1804, 1806, 1808, 1810 for each of the entries. The fields 1802, 1804, 1806, 1808, 1810 may, according to some embodiments, specify: an application identifier 1802, a base metadata file 1804, a merge map file 1806, a result file 1808, and a validation status 1810. The extension data store 1800 may be created and updated, for example, when a base application is added or updated, an extension is created, etc.

The application identifier 1802 might be a unique alphanumeric label that is associated with a particular base application of the application development platform. The base metadata file 1804 may represent the JSON file that includes allowed extension permissions. The merge map file 1806 may be used to incorporate updates and/or changes creating the result file 1808. The validation status 1810 might indicate, for example, that an extension has been verified as allowed or an error indicates that a correction needs to be made to comply with extension point permissions.

In this way, embodiments may avoid manual merges of differences during synchronous updates from a base application into an extension application. When the developer changes files in the extension application, the updates are not reflected in the source file and are instead stored in a merge map file based on the extension point definitions in the source file. If the base application has the updates for a new version, the extension application can easily merge the content with simple logic.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
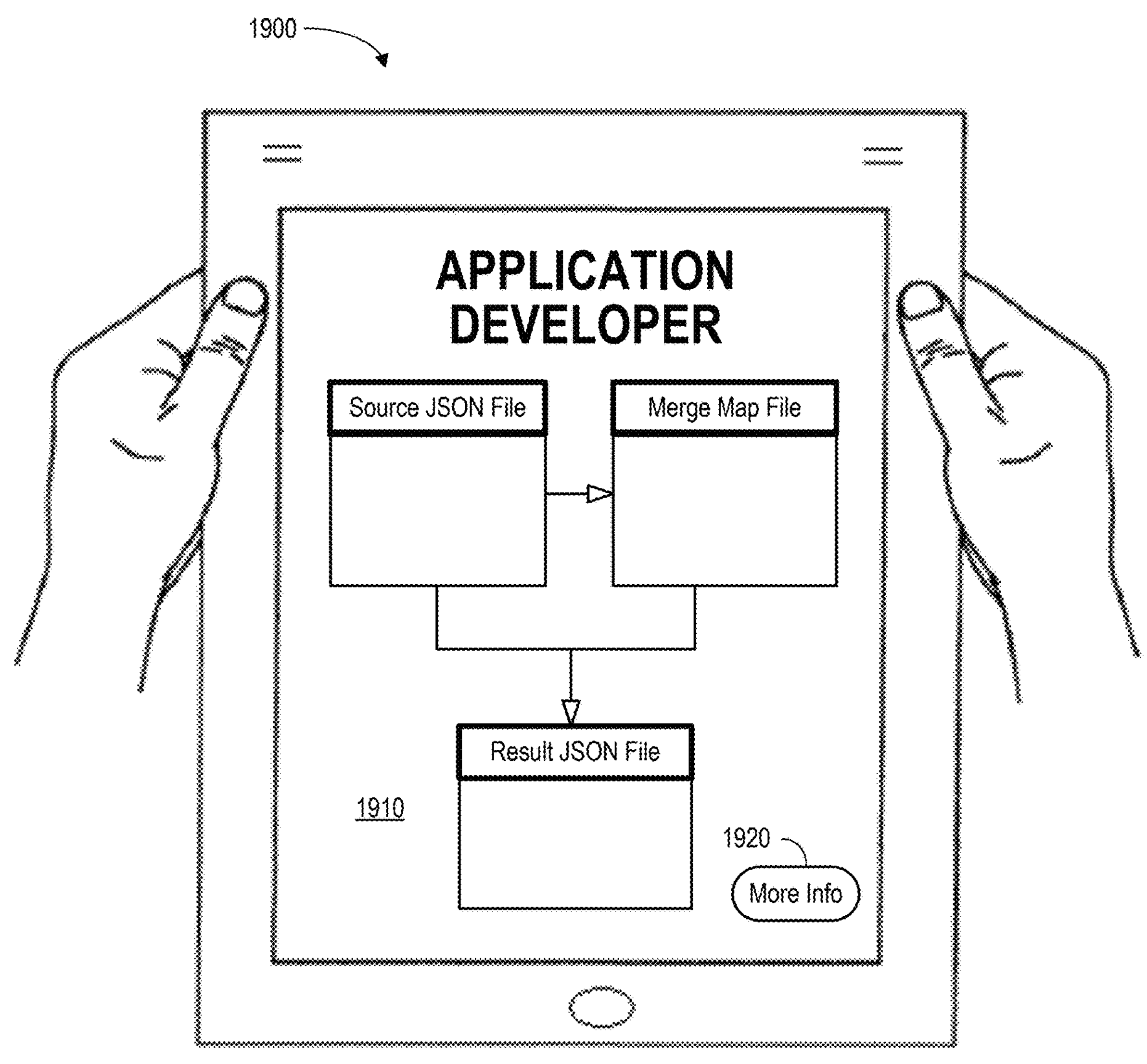
FIG. 19 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and extensions, any of the embodiments described herein could be applied to other types of applications and extensions. Moreover, the displays shown herein are provided only as examples, and any other type of user interface could be implemented. For example, FIG. 19 illustrates a tablet computer 1900 providing an application developer display 1910. The display 1910 might be used, for example, to modify aspects of a metadata document framework, an extension, etc. via selection of a "More Info" icon 1920.

Figure 20:
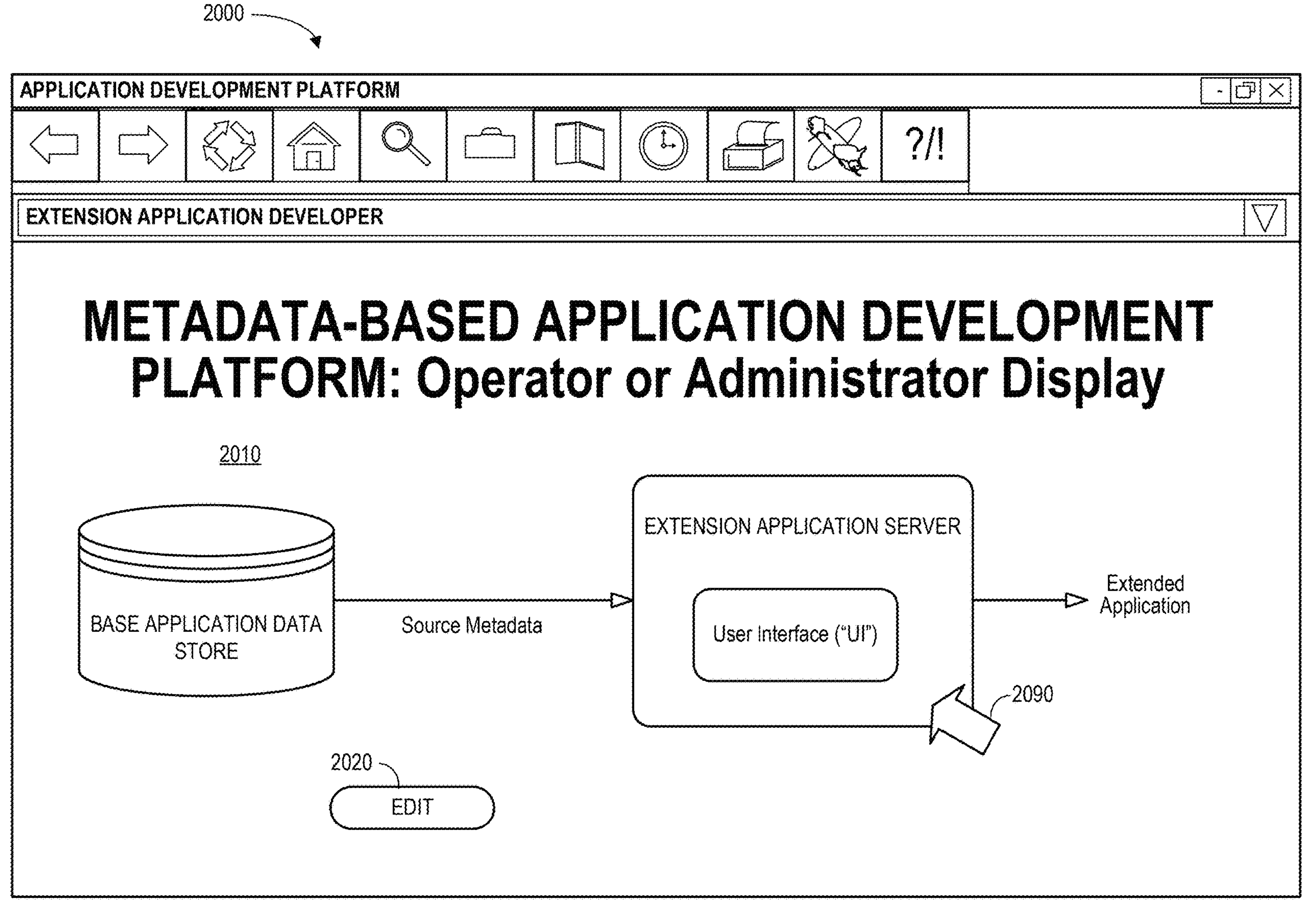
FIG. 20 is an operator or administrator display in accordance with some embodiments.

FIG. 20 is an operator or administrator display in accordance with some embodiments. The display 2000 includes a graphical representation 2010 of a metadata document update framework in accordance with any of the embodiments described herein. Selection of an element on the display 2000 (e.g., via a touchscreen or computer pointer 2090) may result in display of a pop-up window containing more detailed information about that element and/or various options (e.g., mapping options, extensions, error alerts, etc.). Selection of an "Edit" icon 2020 may also let an operator or administrator adjust the operation of the system (e.g., to change system mappings, adjust a base application data store, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with a metadata-based application development platform, comprising:

- a base application data store containing a base application source metadata file with at least one extension point that defines a permission associated with the at least one extension point in connection with a base application; and
- an extension application server, coupled to the base application data store, including:
  - a computer processor, and
  - a computer memory storing instructions that, when executed by the computer processor, cause the extension application to:
    - retrieve the base application source metadata file,
    - subscribe to application updates for the base application,
    - cache the base application source metadata file as a read only file,
    - automatically generate a merge map file with an extension change to the base application metadata file, and
    - report and validate the extension change accordance with the permission associated with the at least one extension point,
- wherein the base application source metadata file and the merge map file are merged in accordance with the defined permission to create a result metadata file for the base application.

2. The system of claim 1, wherein an error is displayed to an extension developer in substantially real time when the extension change is incompatible with the permission.

3. The system of claim 1, wherein an error summary project report table is provided to a base developer for extension changes that were incompatible with the permission.

4. The system of claim 1, wherein the at least one extension point and permission are associated with a simple property and comprise an indication of which properties are allowed to be extended.

5. The system of claim 1, wherein the at least one extension point and permission are associated with an object property and comprise an ability to add, remove, or override an object property.

6. The system of claim 1, wherein the at least one extension point and permission are associated with an array property and an ability to reorder, remove, or insert information in an array.

7. The system of claim 1, wherein the base application source metadata file includes a plurality of extension points that each define at least one permission in connection with the base application.

8. A computer-implemented method associated with a metadata-based application development platform, comprising:

- retrieving, by a computer processor of an extension application server, a base application source metadata file from a base application data store, the base application source metadata file including at least one extension point that defines a permission associated with the at least one extension point in connection with a base application;
- subscribing, by the computer processor of the extension application server, to application updates for the base application;
- caching, by the computer processor of the extension application server, the base application source metadata file as a read only file;
- automatically generating a merge map file with an extension change to the base application metadata file; and
- reporting and validating the extension change accordance with the permission associated with the at least one extension point,
- wherein the base application source metadata file and the merge map file are merged in accordance with the defined permission to create a result metadata file for the base application.

9. The method of claim 8, wherein an error is displayed to an extension developer in substantially real time when the extension change is incompatible with the permission.

10. The method of claim 8, wherein an error summary project report table is provided to a base developer for extension changes that were incompatible with the permission.

11. The method of claim 8, wherein the at least one extension point and permission are associated with a simple property and comprise an indication of which properties are allowed to be extended.

12. The method of claim 8, wherein the at least one extension point and permission are associated with an object property and comprise an ability to add, remove, or override an object property.

13. The method of claim 8, wherein the at least one extension point and permission are associated with an array property and an ability to reorder, remove, or insert information in an array.

14. The method of claim 8, wherein the base application source metadata file includes a plurality of extension points that each define at least one permission in connection with the base application.

15. A non-transitory, machine-readable medium comprising instructions thereon that, when executed by a processor, cause the processor to execute operations to perform a method associated with a metadata-based application development platform, the method comprising:

retrieving, by a computer processor of an extension application server, a base application source metadata file from a base application data store, the base application source metadata file including at least one extension point that defines a permission associated with the at least one extension point in connection with a base application;

subscribing, by the computer processor of the extension application server, to application updates for the base application;

caching, by the computer processor of the extension application server, the base application source metadata file as a read only file;

automatically generating a merge map file with an extension change to the base application metadata file; and reporting and validating the extension change accordance with the permission associated with the at least one extension point, wherein the base application source metadata file and the merge map file are merged in accordance with the defined permission to create a result metadata file for the base application.

16. The medium of claim 15, wherein: (i) an error is displayed to an extension developer in substantially real time when the extension change is incompatible with the permission, and (ii) an error summary project report table is provided to a base developer for extension changes that were incompatible with the permission.

* * * * *